(12) United States Patent
Kishimoto et al.

(10) Patent No.: US 11,830,300 B2
(45) Date of Patent: Nov. 28, 2023

(54) VEHICLE CONTROL SYSTEM

(71) Applicant: HONDA MOTOR CO., LTD., Tokyo (JP)

(72) Inventors: Takashi Kishimoto, Saitama (JP); Noriyuki Imaeda, Saitama (JP); Yoshifumi Nakamura, Saitama (JP); Jun Ishii, Tokyo (JP); Daiki Higuchi, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 364 days.

(21) Appl. No.: 17/112,158

(22) Filed: Dec. 4, 2020

(65) Prior Publication Data

US 2021/0174610 A1 Jun. 10, 2021

(30) Foreign Application Priority Data

Dec. 9, 2019 (JP) .................................. 2019-222123

(51) Int. Cl.
  *G07C 5/00* (2006.01)
  *B60W 60/00* (2020.01)
  (Continued)

(52) U.S. Cl.
  CPC ........... *G07C 5/085* (2013.01); *B60W 50/085* (2013.01); *B60W 60/005* (2020.02); *G07C 5/008* (2013.01); *B60W 2554/4049* (2020.02)

(58) Field of Classification Search
  CPC ..... G07C 5/085; G07C 5/008; B60W 50/085; B60W 60/005; B60W 2554/4049; B60R 16/0232

See application file for complete search history.

(56) References Cited

U.S. PATENT DOCUMENTS

2006/0276942 A1* 12/2006 Anderson .............. G07C 5/008
  701/3
2010/0017565 A1* 1/2010 Kwon ................... G06F 3/0656
  711/170

(Continued)

FOREIGN PATENT DOCUMENTS

CN  109074733 A   12/2018
JP  2012137803 A   7/2012

(Continued)

OTHER PUBLICATIONS

Machine translation of JP 2018032352 A (Year: 2018).*

(Continued)

*Primary Examiner* — James J Lee
*Assistant Examiner* — Alexander George Matta
(74) *Attorney, Agent, or Firm* — Armstrong Teasdale LLP

(57) ABSTRACT

A vehicle control system includes: a vehicle sensor configured to detect a vehicle state; a first control device connected to the vehicle sensor and provided with a first recording area; a first power supply device configured to supply electric power to the first control device; a second control device connected to the first control device and provided with a second recording area; and a second power supply device configured to supply electric power to the second control device. The first control device is configured to record vehicle data including the vehicle state in the first recording area at a prescribed timing and to transmit the vehicle data to the second control device on a prescribed cycle. The second control device is configured to record the vehicle data received from the first control device in the second recording area at a prescribed timing.

7 Claims, 3 Drawing Sheets

(51) Int. Cl.
  *G07C 5/08*   (2006.01)
  *B60W 50/08*  (2020.01)

(56) References Cited

U.S. PATENT DOCUMENTS

| | | |
|---|---|---|
| 2012/0166038 A1 | 6/2012 | Nishino et al. |
| 2015/0303716 A1* | 10/2015 | Lee ................ B60L 58/20 |
| | | 307/10.1 |
| 2019/0066402 A1* | 2/2019 | Unagami ............ B60W 50/082 |
| 2020/0026289 A1* | 1/2020 | Alvarez ................ G07C 5/085 |
| 2020/0174677 A1* | 6/2020 | Golov ................... G06F 3/0659 |
| 2020/0302702 A1* | 9/2020 | Rodriguez Bravo ....................... |
| | | G05D 1/0061 |

FOREIGN PATENT DOCUMENTS

| | | |
|---|---|---|
| JP | 5106756 B2 | 12/2012 |
| JP | 2018032352 A * | 3/2018 |
| JP | 2018032352 A | 3/2018 |
| JP | 2019089382 A | 6/2019 |
| JP | 2019153197 A | 9/2019 |
| JP | 2019169066 A | 10/2019 |
| WO | 2018154860 A1 | 8/2018 |

OTHER PUBLICATIONS

JP Office Action for JP Patent Application 2019-222123 dated Jun. 8, 2021; 4 pp.
Office Action for Chinese Patent Application No. 202011423450.3 dated Jul. 15, 2023; 10 pp.

\* cited by examiner

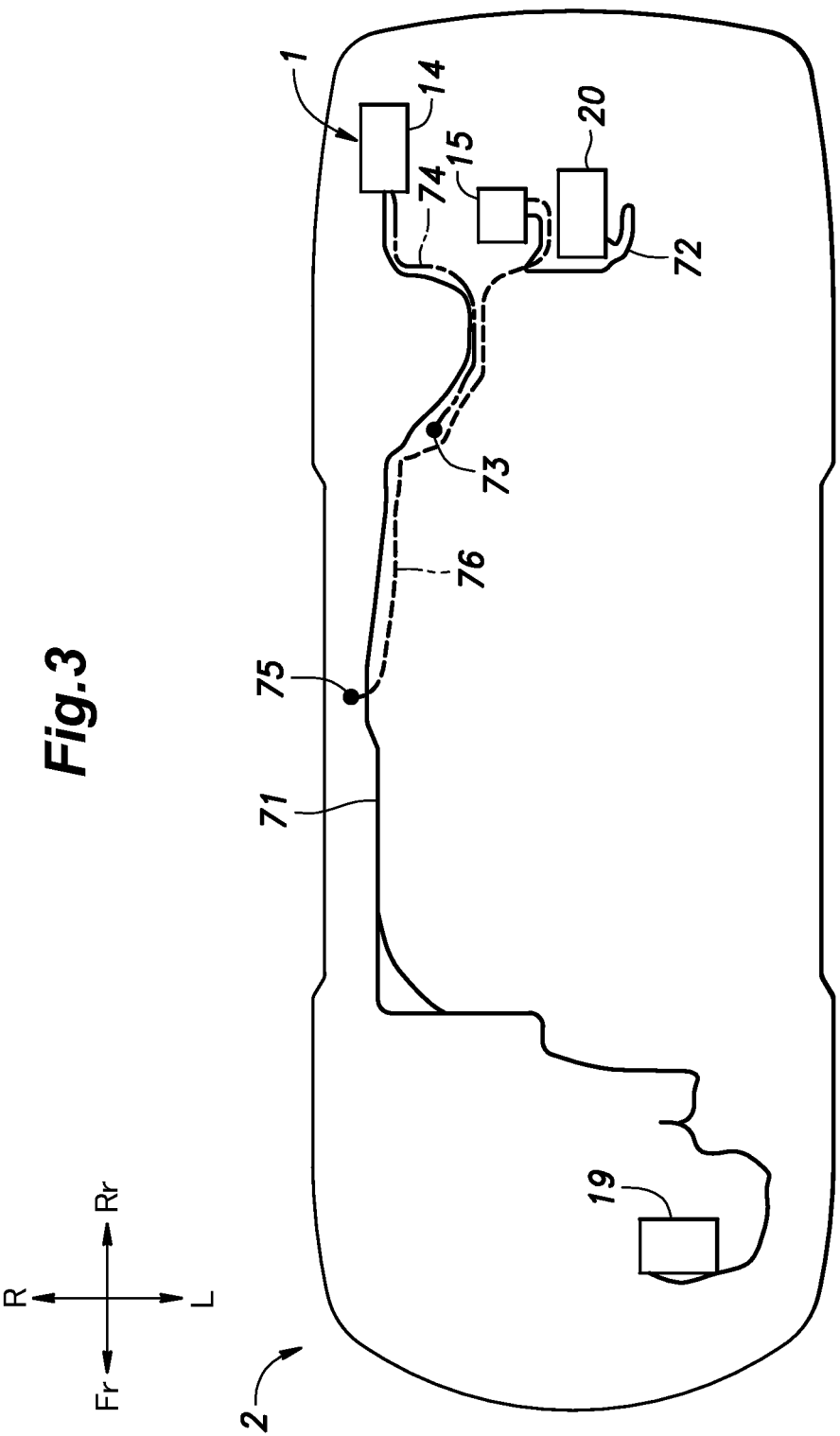

VEHICLE CONTROL SYSTEM

TECHNICAL FIELD

The present invention relates to a vehicle control system.

BACKGROUND ART

Conventionally, a vehicle control system is configured to record vehicle data when an event occurs with regard to a vehicle (for example, Japanese Patent No. 5106756).

In such a vehicle control system, a control device may record the vehicle data. In such a case, if a power supply device that supplies electric power to the control device fails, the control device may not be able to record the vehicle data, and thus the vehicle data may not be extracted.

SUMMARY OF THE INVENTION

In view of such a problem of the prior art, a primary object of the present invention is to provide a vehicle control system that can extract vehicle data even if one of the power supply devices fails.

To achieve such an object, one embodiment of the present invention provides a vehicle control system (1) including: a vehicle sensor (8) configured to detect a vehicle state; a first control device (14) connected to the vehicle sensor and provided with a first recording area (52); a first power supply device (19) configured to supply electric power to the first control device; a second control device (15) connected to the first control device and provided with a second recording area (62); and a second power supply device (20) configured to supply electric power to the second control device, wherein the first control device is configured to record vehicle data including the vehicle state in the first recording area at a prescribed timing and to transmit the vehicle data to the second control device on a prescribed cycle, and the second control device is configured to record the vehicle data received from the first control device in the second recording area at a prescribed timing.

According to this arrangement, even if the first power supply device fails, the second control device can record the vehicle data in the second recording area as long as the second power supply device does not fail. Accordingly, the vehicle data can be extracted from the second recording area by using an external device or the like. Further, even if the second power supply device fails, the first control device can record the vehicle data in the first recording area as long as the first power supply device does not fail. Accordingly, the vehicle data can be extracted from the first recording area by using the external device or the like. In this way, even if one of the first power supply device and the second power supply device fails, the vehicle data can be extracted.

In the above arrangement, preferably, the vehicle control system further includes an event detecting unit (10) configured to detect a prescribed event that has occurred with regard to a vehicle (2), wherein the first control device is configured to record the vehicle data in the first recording area upon receiving event information about the event from the event detecting unit, and the second control device is configured to record the vehicle data in the second recording area upon receiving the event information from the first control device.

According to this arrangement, the vehicle data at occurrence of the event can be recorded in the first recording area and the second recording area. Accordingly, it is possible to easily identify the cause of the event.

In the above arrangement, preferably, the first recording area is provided with plural nonvolatile memories (53), and in a case where the first control device successively receives the event information at a time interval less than a prescribed reference interval, the first control device separately records the vehicle data in the nonvolatile memories each time receiving the event information.

According to this arrangement, even if plural events occur successively, the vehicle data at occurrence of each event can be recorded in the first recording area.

In the above arrangement, preferably, the first control device is configured to execute automatic driving control of the vehicle, to record driving switch information in the first recording area each time driving control of the vehicle is switched between the automatic driving control and manual driving control, and to transmit the driving switch information to the second control device on a prescribed cycle, the driving switch information being information about a switch between the automatic driving control and the manual driving control, and the second control device is configured to determine whether the driving switch information is updated upon receiving the driving switch information from the first control device, and to record the driving switch information in the second recording area upon determining that the driving switch information is updated.

According to this arrangement, the driving switch information can be recorded in the first recording area and the second recording area. Accordingly, it is possible to easily identify a driving body (an occupant or a vehicle control system) at occurrence of the event.

In the above arrangement, preferably, the first control device is configured to transmit the vehicle data to the second control device on the prescribed cycle, and the second control device is configured to record the vehicle data in the second recording area upon ceasing to receive the vehicle data from the first control device on the prescribed cycle.

According to this arrangement, in a case where the first power supply device fails and thus the first control device can no longer transmit the vehicle data to the second control device, the second control device can quickly record the vehicle data in the second recording area.

In the above arrangement, preferably, the vehicle control system further includes: a first object sensor (43) and a second object sensor (44) configured to detect a position of an object outside a vehicle; and a third control device (16) connected to the first control device, wherein the first power supply device is configured to supply electric power to the third control device, the second control device is configured to receive a detection signal from the first object sensor, and the third control device is configured to receive a detection signal from the second object sensor.

According to this arrangement, even if the second power supply device fails and thus the second control device can no longer receive the detection signal from the first object sensor, the third control device can receive the detection signal from the second object sensor as long as the first power supply device does not fail. Similarly, even if the first power supply device fails and thus the third control device can no longer receive the detection signal from the second object sensor, the second control device can receive the detection signal from the first object sensor as long as the second power supply device does not fail. In this way, even if one of the first power supply device and the second power supply device fails, the detection signal from one of the first object sensor and the second object sensor can be received, and thus the position of the object outside the vehicle can be identified.

In the above arrangement, preferably, the vehicle control system further includes: a first harness (71) configured to connect the first control device and the first power supply device; and a second harness (72) configured to connect the second control device and the second power supply device, wherein the first control device is electrically grounded at a first ground point (73), and the second control device is electrically grounded at a second ground point (75), the first harness and the second harness are not bound together, and the first ground point and the second ground point are separated from each other.

According to this arrangement, it is possible to prevent the first harness and the second harness from simultaneously falling into a poor connection state, and to prevent the first ground point and the second ground point from simultaneously falling into malfunction. Accordingly, in a case where one of the first control device and the second control device cannot record the vehicle data, it is highly probable that the other of the first control device and the second control device can record the vehicle data.

In the above arrangement, preferably, the first control device and the second control device are separated from each other, and the first power supply device and the second power supply device are separated from each other.

According to this arrangement, it is possible to prevent the first control device and the second control device from becoming unusable simultaneously, and to prevent the first power supply device and the second power supply device from failing simultaneously. Accordingly, in a case where one of the first control device and the second control device cannot record the vehicle data, it is highly probable that the other of the first control device and the second control device can record the vehicle data.

In the above arrangement, preferably, the second control device is configured to perform mirroring of the first recording area and the second recording area when recording the vehicle data in the second recording area.

According to this arrangement, the vehicle data recorded in the second recording area can be the same as the vehicle data recorded in the first recording area.

Thus, according to the above arrangements, it is possible to provide a vehicle control system that can extract vehicle data even if one of the power supply devices fails.

BRIEF DESCRIPTION OF THE DRAWING(S)

FIG. 3 is a schematic plan view of a vehicle on which the vehicle control system is mounted.

DESCRIPTION OF THE PREFERRED EMBODIMENT(S)

<The Vehicle Control System 1>

In the following, a vehicle control system 1 according to an embodiment of the present invention will be described with reference to the drawings. The vehicle control system 1 is mounted on a vehicle 2 such as a four-wheeled automobile, and is configured to control the vehicle 2.

Figure 1:
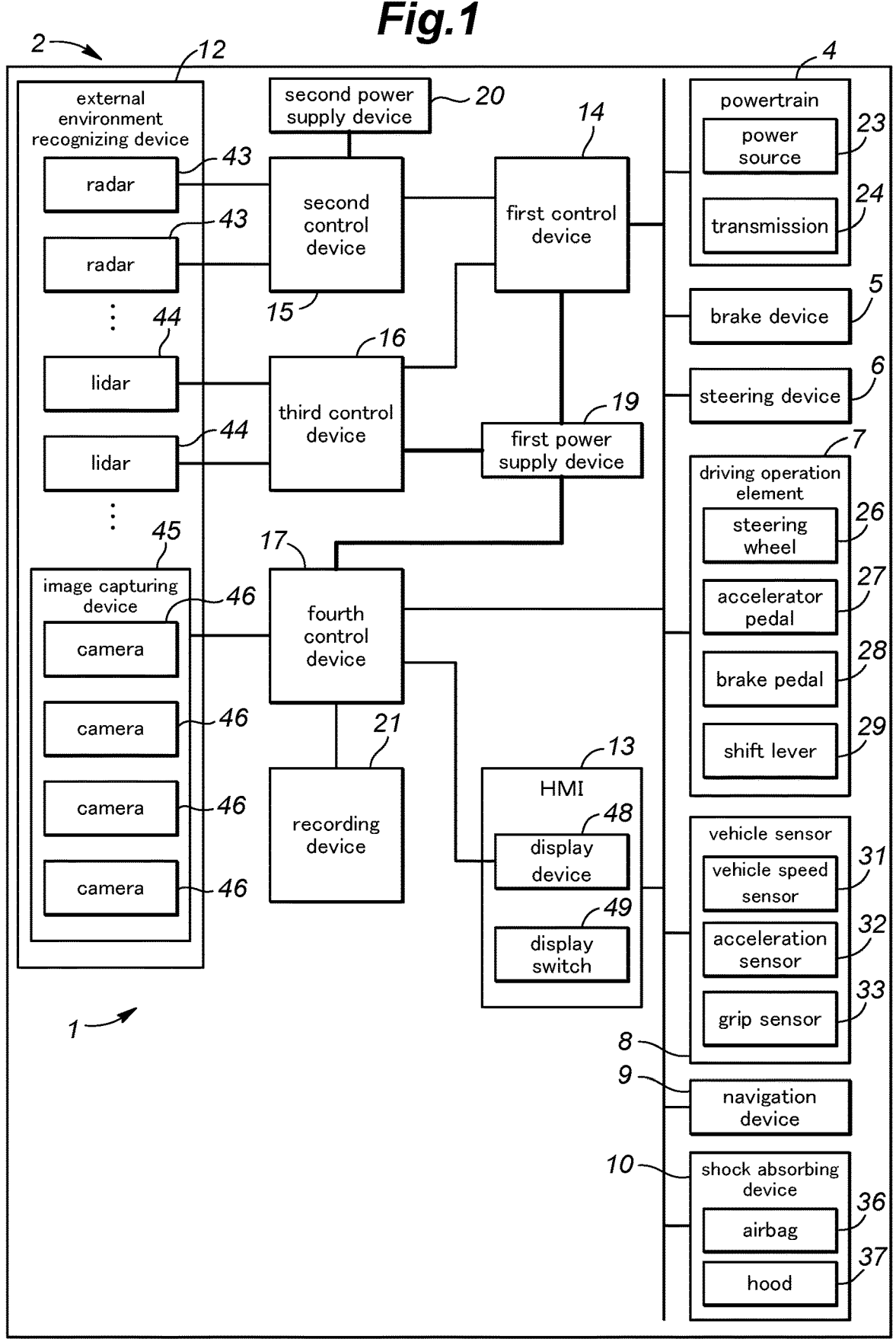
FIG. 1 is a block diagram of a vehicle control system according to an embodiment.

With reference to FIG. 1, the vehicle control system 1 includes a powertrain 4, a brake device 5, a steering device 6, a driving operation element 7, a vehicle sensor 8, a navigation device 9, a shock absorbing device 10 (an example of an event detecting unit), an external environment recognizing device 12, a Human Machine Interface 13 (HMI), first to fourth control devices 14 to 17, first and second power supply devices 19 and 20, and a recording device 21. In the following, the above-mentioned components of the vehicle control system 1 will be described one by one.

The powertrain 4 is a device configured to apply a driving force to the vehicle 2. For example, the powertrain 4 includes a power source 23 and a transmission 24. The power source 23 includes at least one of an internal combustion engine such as a gasoline engine or a diesel engine and an electric motor.

The brake device 5 is a device configured to apply a brake force to the vehicle 2. For example, the brake device 5 includes a brake caliper configured to press a pad against a brake rotor, and an electric cylinder configured to supply an oil pressure to the brake caliper.

The steering device 6 is a device configured to change a steering angle of wheels. For example, the steering device 6 includes a rack-and-pinion mechanism configured to steer (turn) the wheels, and an electric motor configured to drive the rack-and-pinion mechanism.

The driving operation element 7 is an operation element provided inside a vehicle cabin and configured to receive a driving operation of the vehicle 2 by an occupant. For example, the driving operation element 7 includes a steering wheel 26 configured to receive a steering operation of the vehicle 2, an accelerator pedal 27 configured to receive an acceleration operation of the vehicle 2, a brake pedal 28 configured to receive a brake operation of the vehicle 2, a shift lever 29 configured to receive an operation for switching a shift range of the vehicle 2. For example, the shift range of the vehicle 2 includes a forward range, a reverse range, a neutral range, a parking range, and the like. The forward range is a shift range to transmit a driving force of the power source 23 to the wheels and thus to move the vehicle 2 forward. The reverse range is a shift range to transmit the driving force of the power source 23 to the wheels and thus to reverse the vehicle 2. The neutral range is a shift range in which the wheels are rotatable and the driving force of the power source 23 is not transmitted to the wheels. The parking range is a shift range in which the rotation of the wheels is restricted and the driving force of the power source 23 is not transmitted to the wheels.

The vehicle sensor 8 is a sensor configured to detect various vehicle states (namely, various states of the vehicle 2). For example, the vehicle sensor 8 includes a vehicle speed sensor 31 configured to detect the vehicle speed of the vehicle 2, an acceleration sensor 32 configured to detect the acceleration of the vehicle 2, and a grip sensor 33 configured to detect that the occupant grips the steering wheel 26.

The navigation device 9 is a device configured to acquire the current position of the vehicle 2 and to provide route guidance to a destination or the like. The navigation device 9 includes a GPS receiving unit and a map storing unit. The GPS receiving unit is configured to identify the current position (latitude and longitude) of the vehicle 2 based on a signal received from an artificial satellite (positioning satellite). The map storing unit includes a flash memory, a hard disk, and the like, and is configured to store map information.

The shock absorbing device 10 is a device configured to absorb a shock caused by a collision (hereinafter referred to as "vehicle collision") between the vehicle 2 and an object outside the vehicle 2 (for example, another vehicle, an obstacle, or a pedestrian). For example, the shock absorbing device 10 includes an airbag 36 and a hood 37 (a pop-up hood). For example, the airbag 36 is provided in the steering wheel 26 and/or a passenger seat. The airbag 36 is deployed at occurrence of the vehicle collision, thereby reducing an impact on the occupant. For example, the hood 37 is configured to cover the power source 23 from above. The hood 37 is partially lifted at the occurrence of the vehicle collision, thereby forming a space between the hood 37 and the power source 23 and reducing an impact on the pedestrian.

The external environment recognizing device 12 is a device configured to detect the object outside the vehicle 2. For example, the external environment recognizing device 12 includes plural radars 43 (an example of a first object sensor), plural lidars 44 (an example of a second object sensor), and an image capturing device 45 (an example of a vehicle information acquiring unit). Each radar 43 emits radio waves such as millimeter waves around the vehicle 2 and captures the reflected radio waves, thereby detecting a position of the object outside the vehicle 2 (the distance between the vehicle 2 and the object outside the vehicle 2 and the direction of the object outside the vehicle 2). Each lidar 44 emits light such as infrared rays around the vehicle 2 and captures the reflected light, thereby detecting the position of the object outside the vehicle 2. The image capturing device 45 is a device configured to capture a surrounding image of the vehicle 2 (an example of vehicle information; hereinafter simply referred to as "the surrounding image"). The surrounding image captured by the image capturing device 45 is a moving image. In another embodiment, the surrounding image captured by the image capturing device 45 may be a static image. The image capturing device 45 includes four cameras 46 configured to capture images of a front side, a rear side, a left side, and a right side of the vehicle 2, respectively. Accordingly, it is possible to accurately recognize a surrounding situation of the vehicle 2 based on the surrounding image captured by the image capturing device 45.

The HMI 13 is an input/output device configured to notify the occupant of various pieces of information and to receive an input operation by the occupant. For example, the HMI 13 includes a display device 48 and a display switch 49. The display device 48 includes a display screen such as a liquid crystal display or an organic EL display, and is configured to display the surrounding image. The display switch 49 is configured to receive a display operation of the surrounding image (namely, an operation to display the surrounding image) performed by the occupant.

Each of the first to fourth control devices 14 to 17 consists of an electronic control unit (ECU) including a CPU, a ROM, a RAM, and the like, and operates as the CPU executes arithmetic processing according to a program.

The first control device 14 is connected to the powertrain 4, the brake device 5, the steering device 6, the driving operation element 7, the vehicle sensor 8, the navigation device 9, the shock absorbing device 10, the HMI 13, and the like via a communication network such as a Controller Area Network (CAN).

The first control device 14 is configured to execute automatic driving control of the vehicle 2. When executing the automatic driving control, the first control device 14 controls at least one of the powertrain 4, the brake device 5, and the steering device 6 regardless of an operation on the driving operation element 7 by the occupant. For example, the automatic driving control executed by the first control device 14 includes Minimal Risk Maneuver (MRM), Side Collision Mitigation (SCM), Road Departure Mitigation (RDM), and Auto Lane Change (ALC). MRM is the control to move the vehicle 2 to a safe place and to cause an emergency stop of the vehicle 2 while degenerating the automatic driving control in a case where the occupant does not respond to the driving change request from the first control device 14. SCM is the control to move the vehicle 2 in a direction to avoid or mitigate the vehicle collision in a case where the object outside the vehicle 2 is detected approaching the side of the vehicle 2. RDM is the control to move the vehicle 2 in a direction to avoid or mitigate departure (deviation) of the vehicle 2 from a travel lane in a case where the departure of the vehicle 2 from the travel lane is detected or estimated. ALC is the control to automatically change lanes.

The first control device 14 is configured to execute manual driving control of the vehicle 2. When executing the manual driving control, the first control device 14 controls the powertrain 4, the brake device 5, and the steering device 6 according to the operation on the driving operation element 7 by the occupant. For example, when executing the manual driving control, the first control device 14 controls the powertrain 4 according to a signal from an accelerator pedal sensor configured to detect a pressing amount of the accelerator pedal 27, controls the brake device 5 according to a signal from a brake pedal sensor configured to detect a pressing amount of the brake pedal 28, and controls the steering device 6 according to a signal from a turning angle sensor configured to detect a turning angle of the steering wheel 26. In another embodiment, a control device configured to execute the manual driving control of the vehicle 2 may be separate from a control device configured to execute the automatic driving control of the vehicle 2.

The second control device 15 is connected to the radars 43 via the communication network. The second control device 15 receives detection signals from the radars 43 and thus integrates the received detection signals, thereby recognizing the position of the object outside the vehicle 2. The second control device 15 is connected to the first control device 14 via the communication network.

The third control device 16 is connected to the lidars 44 via the communication network. The third control device 16 receives detection signals from the lidars 44 and thus integrates the received detection signals, thereby recognizing the position of the object outside the vehicle 2. The third control device 16 is connected to the first control device 14 via the communication network.

The fourth control device 17 is connected to the powertrain 4, the brake device 5, the steering device 6, the driving operation element 7, the vehicle sensor 8, the navigation device 9, the shock absorbing device 10, the HMI 13, the first control device 14, and the like via the communication network. The fourth control device 17 is connected to the image capturing device 45 via a digital communication line. The fourth control device 17 is configured to receive the surrounding image from the image capturing device 45 and to integrate the received surrounding image. The fourth control device 17 is connected to the display device 48 via a digital communication line, and is configured to transmit the integrated surrounding image to the display device 48.

The fourth control device 17 is configured to execute automatic parking control of the vehicle 2. When executing the automatic parking control, the fourth control device 17 controls the powertrain 4, the brake device 5, and the steering device 6 regardless of the operation on the driving operation element 7 by the occupant, thereby automatically moving the vehicle 2 to a prescribed target parking position and to stop the vehicle 2 there.

Each of the first and second power supply devices 19 and 20 includes a power supply circuit and a battery. The first power supply device 19 is connected to the first control device 14, the third control device 16, and the fourth control device 17, and is configured to supply electric power to the first control device 14, the third control device 16, and the fourth control device 17. The second power supply device 20 is connected to the second control device 15, and is configured to supply electric power to the second control device 15.

The recording device 21 consists of an electronic control unit (ECU) including a CPU, a ROM, a RAM, and the like, and operates as the CPU executes arithmetic processing according to a program. The recording device 21 is connected to the fourth control device 17 via an analog communication line, and is configured to receive the surrounding image from the fourth control device 17. The recording device 21 is connected to the first control device 14 via the communication network and the fourth control device 17, and is configured to receive a recording request signal from the first control device 14. The recording device 21 is configured to record the surrounding image received from the fourth control device 17 in files for each time range in which the surrounding image is captured and to store the surrounding image in an inside area of the recording device 21 according to the recording request signal from the first control device 14. For example, while receiving the recording request signal from the first control device 14, the recording device 21 continuously (constantly) records the surrounding image received from the fourth control device 17 in the files and stores the surrounding image in the inside area of the recording device 21.

<The Control at the Failure of the First and Second Power Supply Devices 19 and 20>

With reference to FIG. 1, in a case where the first power supply device 19 fails, the first power supply device 19 can no longer supply electric power to the third control device 16. Accordingly, the third control device 16 may not be able to receive the detection signals from the lidars 44. However, even in such a case, electric power can be supplied from the second power supply device 20 to the second control device 15 as long as the second power supply device 20 does not fail. Accordingly, the second control device 15 can receive the detection signals from the radars 43 and identify the position of the object outside the vehicle 2 by integrating the received detection signals.

In a case where the second power supply device 20 fails, the second power supply device 20 can no longer supply electric power to the second control device 15. Accordingly, the second control device 15 may not be able to receive the detection signals from the radars 43. However, even in such a case, electric power can be supplied from the first power supply device 19 to the third control device 16 as long as the first power supply device 19 does not fail. Accordingly, the third control device 16 can receive the detection signals from the lidars 44 and identify the position of the object outside the vehicle 2 by integrating the received detection signals.

In this way, in the present embodiment, even if one of the first power supply device 19 and the second power supply device 20 fails, the detection signals from the radars 43 or the lidars 44 can be received, and thus the position of the object outside the vehicle 2 can be identified. Accordingly, in a case where one of the first power supply device 19 and the second power supply device 20 fails while the first control device 14 is executing the automatic driving control of the vehicle 2, the automatic driving control can be degenerated smoothly.

<The Configurations of the First and Second Control Devices 14 and 15>

Figure 2:
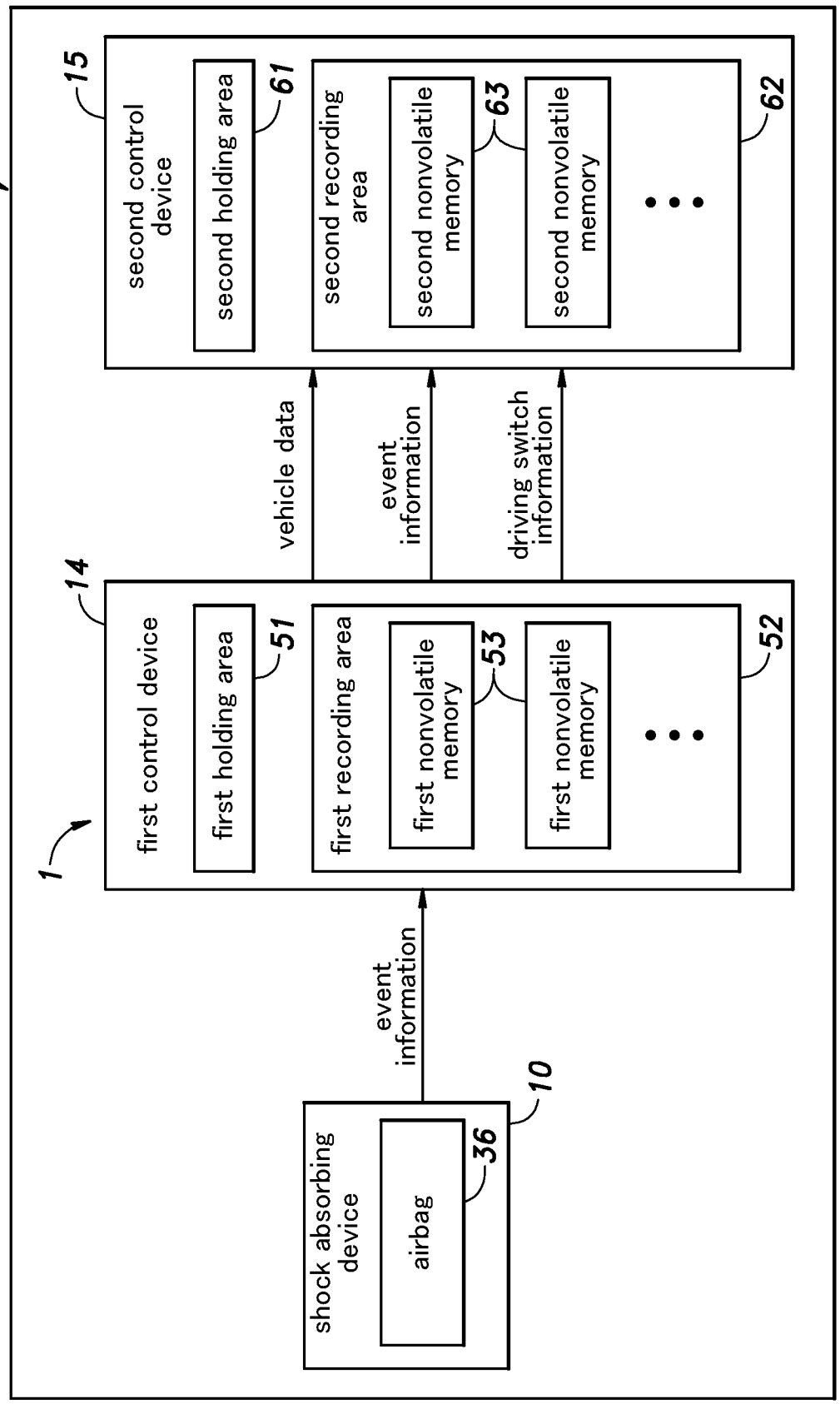
FIG. 2 is a block diagram of a main part of the vehicle control system.

With reference to FIG. 2, the first control device 14 is provided with a first holding area 51 and a first recording area 52. The first holding area 51 consists of a volatile memory. The first recording area 52 is provided with plural first nonvolatile memories 53.

The second control device 15 is provided with a second holding area 61 and a second recording area 62. The second holding area 61 consists of a volatile memory. The second recording area 62 is provided with plural second nonvolatile memories 63.

<The Recording of the Vehicle Data by the First and Second Control Devices 14 and 15>

With reference to FIG. 2, in a state where an ignition of the vehicle 2 is ON, the vehicle data on a prescribed sampling cycle X for a prescribed reference period Y (for example, on a 100 msec cycle for 24 seconds) is held in the first holding area 51 by using a ring buffer. For example, the above-mentioned vehicle data includes the data of the vehicle states detected by the vehicle sensor 8 and internal variables of the vehicle control system 1. Each time acquiring the latest vehicle data on the sampling cycle X, the first control device 14 transmits the acquired latest vehicle data to the second control device 15. Also, each time acquiring the latest vehicle data on the sampling cycle X, the first control device 14 overwrites a part (namely, the oldest sampling data for one time) of the vehicle data in the first holding area 51 with the acquired latest vehicle data. Accordingly, the first holding area 51 always holds the latest vehicle data for the reference period Y.

In a state where the ignition of the vehicle 2 is ON, the vehicle data on the sampling cycle X for the reference period Y is held in the second holding area 61 by using a ring buffer. Each time receiving the latest vehicle data from the first control device 14 on the sampling cycle X, the second control device 15 overwrites a part (namely, the oldest sampling data for one time) of the vehicle data in the second holding area 61 with the received latest vehicle data. Accordingly, the second holding area 61 always holds the latest vehicle data for the reference period Y.

When a prescribed event occurs with regard to the vehicle 2, the first control device 14 receives information about this event (hereinafter referred to as "event information"). For example, when the airbag 36 is deployed, the shock absorbing device 10 detects the deployment of the airbag 36 and transmits the event information to the first control device 14. Accordingly, the first control device 14 receives the event information from the shock absorbing device 10.

The first control device 14 transmits the event information to the second control device 15 upon receiving the event information from the shock absorbing device 10. Further, the first control device 14 transfers the latest vehicle data for the reference period Y held in the first holding area 51 to the first recording area 52 upon receiving the event information from the shock absorbing device 10, and thus records the latest vehicle data in one of the first nonvolatile memories 53. Accordingly, the vehicle data at occurrence of the event can be recorded in the first recording area 52, and thus the cause of the event can be easily identified.

In a case where plural events occur successively and thus the first control device 14 successively receives the event information at a time interval less than a prescribed reference interval Z, the first control device 14 separately records the vehicle data in the first nonvolatile memories 53 each time receiving the event information. Thus, even if plural events occur successively, the vehicle data at occurrence of each event can be recorded in the first recording area 52.

The second control device 15 transfers the latest vehicle data for the reference period Y held in the second holding area 61 to the second recording area 62 upon receiving the event information from the first control device 14, and thus records the latest vehicle data in one of the second nonvolatile memories 63. Accordingly, the vehicle data at occurrence of the event can be recorded in the second recording area 62, and thus the cause of the event can be easily identified.

When recording the latest vehicle data in one of the second nonvolatile memories 63 in this way, the second control device 15 performs mirroring of the first recording area 52 and the second recording area 62. Thus, the vehicle data recorded in the second recording area 62 can be the same as the vehicle data recorded in the first recording area 52. In another embodiment, when recording the latest vehicle data in one of the second nonvolatile memories 63 as described above, the second control device 15 may record only a part of the vehicle data recorded in the first recording area 52 in the second recording area 62.

In a case where plural events occur successively and thus the second control device 15 successively receives the event information at a time interval less than the reference interval Z, the second control device 15 separately records the vehicle data in the second nonvolatile memories 63 each time receiving the event information. Thus, even if plural events occur successively, the vehicle data at occurrence of each event can be recorded in the second recording area 62.

Upon ceasing to receive the vehicle data from the first control device 14 on the sampling cycle X, the second control device 15 transfers the latest vehicle data for the reference period Y held in the second holding area 61 to the second recording area 62, and thus records the latest vehicle data in one of the second nonvolatile memories 63. Accordingly, in a case where the first power supply device 19 fails and thus the first control device 14 can no longer transmit the vehicle data to the second control device 15, the second control device 15 can quickly record the vehicle data in the second recording area 62.

As described above, in the present embodiment, the first control device 14 connected to the first power supply device 19 records the vehicle data in the first recording area 52, and the second control device 15 connected to the second power supply device 20 records the vehicle data in the second recording area 62. Thus, even if the first power supply device 19 fails, the second control device 15 can record the vehicle data in the second recording area 62 as long as the second power supply device 20 does not fail. Accordingly, the vehicle data can be extracted from the second recording area 62 by using an external device or the like. Further, even if the second power supply device 20 fails, the first control device 14 can record the vehicle data in the first recording area 52 as long as the first power supply device 19 does not fail. Accordingly, the vehicle data can be extracted from the first recording area 52 by using the external device or the like. In this way, even if one of the first power supply device 19 and the second power supply device 20 fails, the vehicle data can be extracted.

<The Recording of the Driving Switch Information by the First and Second Control Devices 14 and 15>

Each time driving control of the vehicle 2 is switched between the automatic driving control and the manual driving control, the first control device 14 records driving switch information in the first recording area 52. The driving switch information is information about a switch between the automatic driving control and the manual driving control. For example, the driving switch information includes information about a switching time when the driving control of the vehicle 2 is switched between the automatic driving control and the manual driving control and information about the position of the vehicle 2 at the switching time. The first control device 14 transmits the driving switch information to the second control device 15 on the sampling cycle X.

Each time receiving the driving switch information from the first control device 14 on the sampling cycle X, the second control device 15 determines whether the driving switch information is updated (whether the driving switch information received this time is different from the driving switch information received the last time). In a case where the second control device 15 determines that the driving switch information is updated, the second control device 15 records the driving switch information in the second recording area 62. On the other hand, in a case where the second control device 15 determines that the driving switch information is not updated, the second control device 15 does not record the driving switch information in the second recording area 62.

In this way, in the present embodiment, the driving switch information is recorded in the first recording area 52 and the second recording area 62. Accordingly, it is possible to easily identify a driving body (the occupant or the vehicle control system 1) at occurrence of the event.

<The Arrangement of the Vehicle Control System 1 in the Vehicle 2>

Next, with reference to FIG. 3, the arrangement of the vehicle control system 1 in the vehicle 2 will be described. The arrows Fr, Rr, L, and R in FIG. 3 indicate a front side, a rear side, a left side, and a right side of the vehicle 2, respectively.

The first control device 14 and the second control device 15 are arranged in a rear portion of the vehicle 2. The first control device 14 and the second control device 15 are separated from each other. The first power supply device 19 is arranged in a front portion of the vehicle 2, and the second power supply device 20 is arranged in the rear portion of the vehicle 2. The first power supply device 19 and the second power supply device 20 are separated from each other.

According to such arrangements, it is possible to prevent the first control device 14 and the second control device 15 from becoming unusable simultaneously, and to prevent the first power supply device 19 and the second power supply device 20 from failing simultaneously. Accordingly, in a case where one of the first control device 14 and the second control device 15 cannot record the vehicle data, it is highly probable that the other of the first control device 14 and the second control device 15 can record the vehicle data.

The first control device 14 and the first power supply device 19 are connected to each other via a first harness 71, and the second control device 15 and the second power supply device 20 are connected to each other via a second harness 72. The first harness 71 and the second harness 72 are separated from each other, and not bound together. A first ground point 73 at which the first control device 14 is electrically grounded is provided in the rear portion of the vehicle 2. The first control device 14 and the first ground point 73 are connected to each other via a first ground wire 74. A second ground point 75 at which the second control device 15 is electrically grounded is provided at a fore-andaft center portion of the vehicle 2. The second control device 15 and the second ground point 75 are connected to each other via a second ground wire 76. The first ground point 73 and the second ground point 75 are separated from each other.

According to such arrangements, it is possible to prevent the first harness 71 and the second harness 72 from simultaneously falling into a poor connection state, and to prevent the first ground point 73 and the second ground point 75 from simultaneously falling into malfunction. Accordingly, in a case where one of the first control device 14 and the second control device 15 cannot record the vehicle data, it is highly probable that the other of the first control device 14 and the second control device 15 can record the vehicle data.

Concrete embodiments of the present invention have been described in the foregoing, but the present invention should not be limited by the foregoing embodiments and various modifications and alterations are possible within the scope of the present invention.

The invention claimed is:

1. A vehicle control system, comprising:
a vehicle sensor configured to detect a vehicle state;
a first control device connected to the vehicle sensor and provided with a first recording area;
a first power supply device configured to supply electric power to the first control device;
a second control device connected to the first control device and provided with a second recording area;
a second power supply device configured to supply electric power to the second control device; and
an event detecting unit configured to detect a prescribed event that has occurred with regard to a vehicle,
wherein the first control device is configured to record vehicle data including the vehicle state in the first recording area at a prescribed timing and to transmit the vehicle data to the second control device on a prescribed cycle, and
the second control device is configured to record the vehicle data received from the first control device in the second recording area at a prescribed timing,
wherein the first control device is configured to record the vehicle data in the first recording area upon receiving event information about the event from the event detecting unit, and
the second control device is configured to record the vehicle data in the second recording area upon receiving the event information from the first control device,
wherein the first control device is configured to execute automatic driving control of the vehicle, to record driving switch information in the first recording area each time driving control of the vehicle is switched between the automatic driving control and manual driving control, and to transmit the driving switch information to the second control device on a prescribed cycle, the driving switch information being information about a switch between the automatic driving control and the manual driving control, and
the second control device is configured to determine whether the driving switch information is updated upon receiving the driving switch information from the first control device, and to record the driving switch information in the second recording area upon determining that the driving switch information is updated.

2. The vehicle control system according to claim 1, wherein the first control device is configured to transmit the vehicle data to the second control device on the prescribed cycle, and
the second control device is configured to record the vehicle data in the second recording area upon ceasing to receive the vehicle data from the first control device on the prescribed cycle.

3. The vehicle control system according to claim 1, further comprising:
a first object sensor and a second object sensor configured to detect a position of an object outside the vehicle; and
a third control device connected to the first control device,
wherein the first power supply device is configured to supply electric power to the third control device,
the second control device is configured to receive a detection signal from the first object sensor, and
the third control device is configured to receive a detection signal from the second object sensor.

4. The vehicle control system according to claim 1, further comprising:
a first harness configured to connect the first control device and the first power supply device; and
a second harness configured to connect the second control device and the second power supply device,
wherein the first control device is electrically grounded at a first ground point, and the second control device is electrically grounded at a second ground point, the first harness and the second harness are not bound together, and
the first ground point and the second ground point are separated from each other.

5. The vehicle control system according to claim 1, wherein the first control device and the second control device are separated from each other, and the first power supply device and the second power supply device are separated from each other.

6. The vehicle control system according to claim 1, wherein the second control device is configured to perform mirroring of the first recording area and the second recording area when recording the vehicle data in the second recording area.

7. The vehicle control system according to claim 1, wherein the first recording area is provided with plural nonvolatile memories, and
in a case where the first control device successively receives the event information at a time interval less than a prescribed reference interval, the first control device separately records the vehicle data in the nonvolatile memories each time receiving the event information.

* * * * *